June 21, 1966 A. GROHSBACH 3,256,749
STEERING MECHANISM
Filed Aug. 22, 1963 3 Sheets-Sheet 1
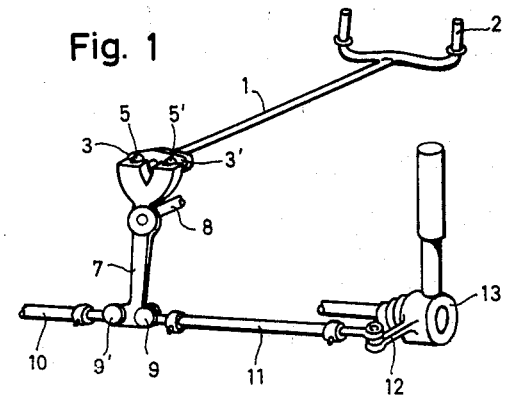
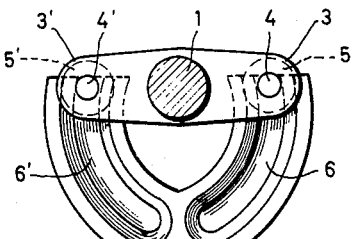
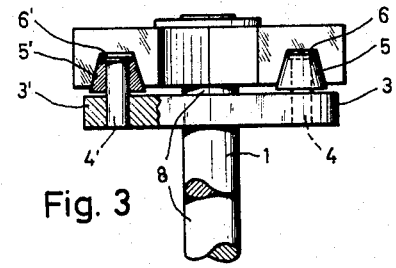
Inventor:
Alfred Grohsbach
By: Spencer & Kaye
Attorneys Inventor:
Alfred Grohsbach
By: Spencer & Kaye
Attorneys United States Patent Office 3,256,749
Patented June 21, 1966

3,256,749
STEERING MECHANISM
Alfred Grohsbach, Klarastrasse 8, Heilbronn
(Neckar), Germany
Filed Aug. 22, 1963, Ser. No. 303,806
Claims priority, application Germany, Sept. 1, 1962,
N 22,034
12 Claims. (Cl. 74—497)

The present invention relates to a steering mechanism for motor vehicles.

More particularly, the present invention relates to a progressive steering mechanism in which the parts which transmit the motion of the steering element to the steering knuckle, i.e., the journal of the axle of the wheel to be steered, are so connected with arms joined to the steering shaft that, with increasing turning of the steering element, the deflection of the steered wheel increases more than linearly. This more than linear relationship between the turning of the steering shaft and the deflection of the steered wheel will hereinafter be referred to as "progressive" steering.

It is known to provide pulling means for transmitting the movement of the steering shaft to the tie rod linkage, which pulling means are in the form of chains, cables, or the like. Such chains have to be accommodated in a specially provided chamber; furthermore, suitable support means have to be provided. Also, these pull-exerting means are subject to stretching and to wear, and, if they are so arranged on the vehicle as to be unprotected, there is the danger that the steering action will be adversely affected or even totally blocked by foreign bodies which, in some manner or other, become lodged in the steering mechanism.

It is, therefore, an object of the present invention to provide a steering arrangement which overcomes the above drawbacks, and, with this object in view, the present invention resides mainly in a steering arrangement which incorporates a steering shaft turnable about a turning axis and having a lower end, two arm means carried by the shaft at its lower end and being turnable together with the shaft, a steering mechanism including a pitman, i.e., a pivotally mounted linkage arm, and a transmitting element which is mounted for pivotal movement about a pivot axis and coacts with the pitman of the steering mechanism. The steering element is provided with grooving for receiving the arm means, this grooving being arranged eccentrically with respect to the pivot axis for producing, upon turning of the steering shaft, a progressive pivoting of the pitman, the arm means being, in the neutral position of the shaft, in mirror-image symmetry with respect to a plane passing through the turning and pivot axes.

According to a further feature of the present invention, the steering shaft has a steering yoke connected to its other end, which steering yoke is provided with two handles and with means for so mounting each handle on the yoke that the former is, in a position skew with respect to the turning axis, subjected substantially exclusively to a parallel displacement. This is accomplished by transmission means which are interposed between the yoke proper and the handles for causing each handle, upon turning of the yoke in at least one direction, to remain oriented in substantially the same direction as such handle was oriented prior to such turning of the yoke. The reason for and advantage of such arrangement will be explained below.

Additional objects and advantages of the present invention will become apparent upon consideration of the following description when taken in conjunction with the accompanying drawings in which:

FIGURE 1 is a perspective view showing the various component parts of a steering arrangement according to the instant invention.

FIGURE 2 is a front view, partly in section, showing the mechanical interconnection between the arm means, the transmitting element, and the pitman.

FIGURE 3 is a fragmentary plan view, partly in section, showing the interaction between the arm means and the transmitting element.

Figure 4:
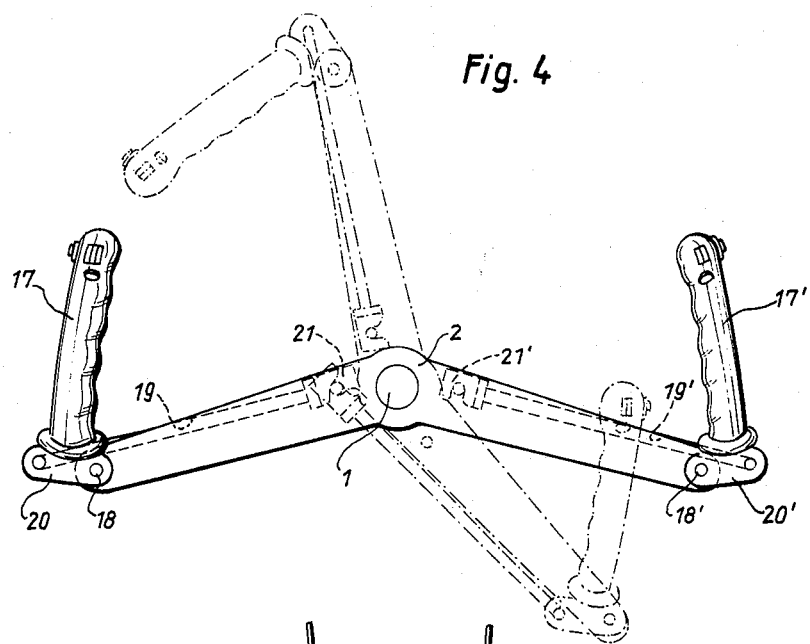
FIGURE 4 shows the control yoke according to the present invention as seen by the operator of the vehicle. The positions of the parts while the steering shaft to which the yoke is connected is in neutral position is shown in solid lines, whereas the position of the parts when the steering column has been turned approximately 100° in counter-clockwise direction is shown in phantom lines.

Referring now to the drawings and to FIGURES 1 through 3 thereof in particular, the same show a steering shaft 1 which is turnable about its own axis and which carries a steering yoke 2 at its upper end. Two arms 3 and 3', shown here as being combined into a single cross-piece, are connected to the lower end of the shaft 1 so as to be turnable therewith. The free ends of the arms 3 and 3' carry pins 4 and 4' which serve as axles for rotatable rollers 5 and 5'. The rollers are received in grooving constituted by two grooves 6 and 6' provided in a transmitting element 60 which itself is pivotally mounted by means of a pivot bearing 8. This transmitting element is combined with a pitman 7 to form a single piece which, as illustrated, is bifurcated at its upper end. The lower end of the pitman 7 carries two ball joints 9 and 9' by means of which the tie rod linkages 10 and 11 are connected to the pitman 7. The other end of the tie rod linkage 11 is shown as being connected to a knuckle arm 12 which transmits the motion of the tie rod linkage 11 to the wheel bearing 13, the latter being attached to the vehicle chassis by means of a conventional wheel suspension.

The grooves 6 and 6' are illustrated as following a path other than that of a circle whose center lies on the turning axis of shaft 1. Instead, the grooves 6 and 6' follow such paths as to produce progressive pivoting of the bifurcated pitman 7. That is to say, when the vehicle is to travel straight, the rollers 5 and 5' are in engagement with the grooves 6 and 6' as shown in FIGURE 1, whereas when the shaft 1 is turned in one or the other direction, the pitman 7 will be pivoted in the corresponding direction so that the tie rod linkages will move to the right or left, as the case may be, this tie rod linkage movement, however, increasing more than linearly with respect to the rotation of the shaft 2 the further this shaft is turned.

The rollers 5 and 5' are provided in order to reduce the friction between the arm means carried at the lower end of the shaft 1 and the transmitting element 60. This friction can be reduced even further by providing suitable ball or roller bearings between the pins 4, 4', and the rollers 5, 5', or by mounting the pins 4, 4', themselves in ball or roller bearings. Also, if the pitman is made axially adjustable, it is expedient to make the rollers 5, 5), as well as the grooves 6, 6', of trapezoidal cross section, as shown, so as to keep the play between the rollers and the walls of the grooves as small as possible.

The grooves 6, 6', are shown as having a constant curvature whose radius is larger than that of the distance between the axis of the shaft 1 and the point at which each of the rollers 5, 5', engages the respective groove 6, 6', while the shaft 1 is in its neutral, or no-deflection, position, in which the vehicle will be made to travel straight. Alternatively, the configuration of the grooves 6, 6', can be such that they have a non-constant, i.e., non-circular, curvature.

As is apparent from FIGURE 2, the arm means, i.e., the arms 3, 3', lie diametrically opposite each other so that the arms 3, 3', will, while the shaft is in its neutral position, be horizontal. Depending, however, on the desired maximum deflection angle of the steered wheel, the arms 3, 3', may be arranged at an angle to each other so as to form an upwardly or downwardly directed V, and all that is requisite for proper operation is that the arm means, in the neutral position of the shaft 1, be in mirror-image symmetry with respect to a plane—normally the vertical plane—passing through the turning axis of the shaft 1 and the pivot axis of the pivot 8.

In the illustrated embodiment, the transmitting element 60 and pitman 7 are shown as being constituted by a single piece which is pivoted on pivot 8. This has been found to be the most practical arrangement. Under certain circumstances, however, it may be expedient to replace the single bifurcated component constituting both the transmitting element 60 and the pitman 7 by two separate components 60 and 7, which components are operatively interconnected in any suitable manner, either directly or indirectly. For example, there may be a positive connection between the two components, or there may be transmission means, such as gearing, interconnecting the pitman 7 and the transmitting element 60.

One of the main advantages of the progressive steering is that the maximum deflection of the steered wheel or wheels is obtained when the steering organ is rotated approximately 90° out of its neutral position. Accordingly, the shaft of a steering arrangement according to the present invention is provided with a steering yoke which takes the place of the conventional wheel, which yoke has two arms extending in opposite directions and terminating at their ends in generally upwardly directed handles. It has been found, however, that if the handles are immovably connected to the arms of the yoke so that the yoke in its entirety is one rigid component, the relatively large force which is required near the end of the turning movement of the shaft 1 will generally place a relatively large strain on the wrist of the operator of the vehicle, particularly on the wrist of that hand which holds the handle which, after the yoke has been turned 90° or so, is toward the operator.

The above drawback is, according to the further feature of the present invention, overcome by pivotally mounting the handles on the yoke. The pivotal mounting may be such that, upon rotation of the yoke, the handles themselves remain oriented in substantially the same direction, i.e., that the handles will, despite turning of the yoke, still point more or less upwardly. This, of course, makes it necessary for the position of the handle to change with respect to that of the arms of the yoke, i.e., the yoke proper. This change of position of the handle with respect to the yoke arms can be affected by means of a transmission which controls the movement of the handle as a function of the turning of the yoke in at least one direction; if such forced movement of the handle can be dispensed with, the pivotal joint between the handle and the yoke arm includes spring means which continuously bias the handle back into its original position which spring means can be so arranged that the spring force exerted thereby increases with increased turning of the yoke.

A handle mounting of the type set forth above also makes it possible for the yoke to be turned more than 90° out of the neutral position which it occupies when the vehicle is to move straight ahead.

It will also be appreciated that, in the case of the progressive steering according to the present invention, the effective lever arm through which the turning force applied to the yoke acts, becomes progressively smaller, and this must be compensated for by increasing the turning moment which the yoke exerts on the pitman with increased deflection. Accordingly, the pivotal arrangement of the handle in the improved yoke according to the present invention is such that the change of position of the handle causes a greater turning moment to be applied to the shaft.

Figure 5:
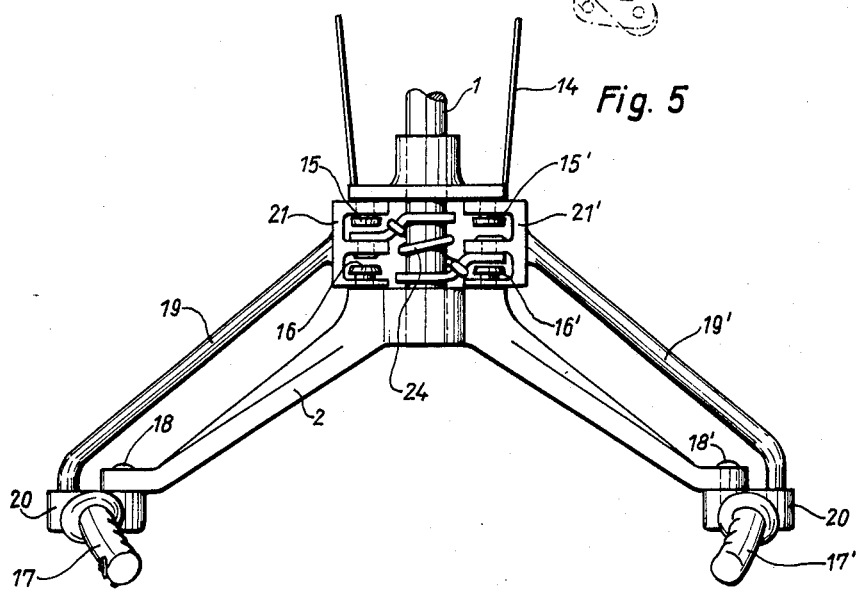
FIGURE 5 is a view of the yoke diagonally from above.
Figure 6:
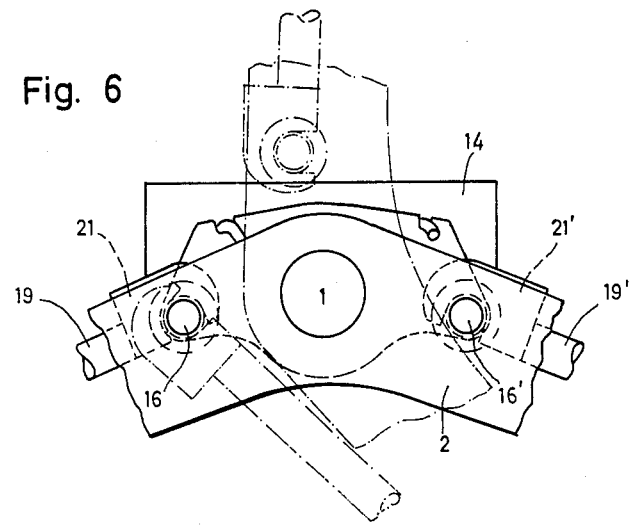
FIGURE 6 is a plan view of the middle of the yoke as seen in the direction of the steering shaft.
Figure 7:
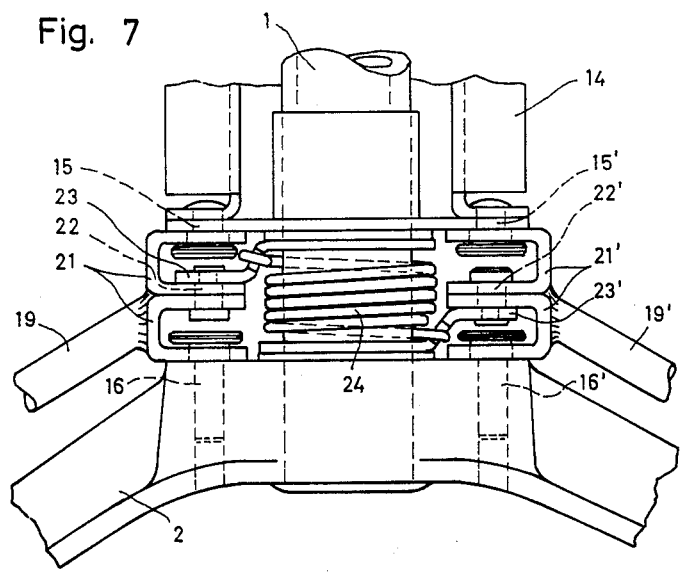
FIGURE 7 is a plan view of the upper end of the steering shaft as seen from directly above this end.

FIGURES 4 through 7 show a yoke whose handles are mounted in accordance with the further feature of the present invention. The front end of the steering column 14 supporting the shaft 1 has attached to it two flanged bolts 15 and 15', while the yoke 2 carries two further flanged bolts 16 and 16' which are coaxial with the bolts 15 and 15', respectively.

Handles 17 and 17' are pivotally mounted at the ends of the arms of the yoke for pivotal movement about axes 18 and 18'. The handles 17, 17', which are arranged so as to be outside of the planes which are transverse to the axis of shaft 1 and occupied by the arms of the yoke, are, in neutral position of the yoke, skewed with respect to the turning axis of the shaft 1. The outer ends of two linkage rods 19 and 19' are attached at 20 and 20' to the lower ends of handles 17 and 17'. The inner ends of the rods 19 and 19' are fixedly connected to hook-like elements 21 and 21' each of which has three fingers. The outer fingers hook over bolts 15, 16, and 15', 16', while the middle fingers are connected, by means of further bolts 22 and 22' which are coaxial with bolts 15, 16, and 15', 16', to guide collars 23 and 23' which themselves are mounted so as to be rotatable about the axis of the shaft 1. The elements 21 and 21' are spring-biased against the bolts 15, 16, and 15', 16', by means of a coil spring 24 which acts on the collars 23 and 23'.

When the yoke 2 is in its neutral position, the elements 21 and 21' have their respective fingers hooked into all of the bolts 15, 16, and 15', 16'. If the yoke is then turned, for example in counter-clockwise direction, the bolt 15 acts as a pivot for the element 21 and the bolt 16 disengages itself from element 21. Upon continued rotation of the yoke, the left arm of the yoke and rod 19 act in the manner of a parallelogram-type linkage and thereby twist the handle 17 in such a manner that the handle will remain in a position which is comfortable for the operator, i.e., in a position which essentially is parallel to the position which the handle 17 occupied at the beginning of the turning of the yoke. The handle 17', however, is locked to the bolt 16' via the rod 19' and the element 21', so that during this counter-clockwise rotation of the yoke, the element 21' which at the beginning of this rotation will have disengaged itself from the bolt 15', as well as the handle 17' will rotate together with the yoke about the axis of shaft 1 during which rotation element 21' and handle 17' will continue to retain the same position relative to the yoke as they occupied prior to the start of the rotation.

The present invention is not limited to an arrangement in which the axes of rotation of the handles are precisely at the points shown in the drawings. Instead, they may lie higher or lower, or be at an angle with respect to the axis of shaft 1. Also, the means for controlling the movement of the handles can be effected differently, as, for example, by mechanical or hydraulic means.

By virtue of the above arrangement, the handles will, during turning of the yoke, be made to occupy positions most comfortable for the vehicle operator.

It will be understood that the above description of the present invention is susceptible to various modifications, changes, and adaptations, and the same are intended to be comprehended within the meaning and range of equivalents of the appended claims.

What is claimed is:

1. A steering arrangement for a vehicle, comprising, in combination:
  (a) a steering shaft turnable about a turning axis and having a lower end;
  (b) two arm means carried by said steering shaft at said lower end thereof and being turnable together with said steering shaft;
  (c) a steering mechanism including a two-armed pitman; and
  (d) a transmitting element mounted for pivotal movement about a pivot axis and coacting with said pitman of said steering mechanism, said transmitting element being provided with two grooves receiving said arm means, respectively, said grooves being arranged eccentrically with respect to said pivot axis for producing, upon turning of said steering shaft, a progressive pivoting of said pitman, said arm means being, in a neutral position of said steering shaft which parts occupy when the vehicle is to move straight ahead, in mirror-image symmetry with respect to a plane passing through said turning and pivot axes, each of said grooves deviating from a circle whose center lies on said turning axis of said shaft and each of said grooves having a constant curvature.

2. A steering arrangement as defined in claim 1 wherein each of said arm means comprises an arm and pin means carried thereby, said pin means running in said grooves of said transmitting element, respectively.

3. A steering arrangement as defined in claim 2 wherein said pitman and said transmitting element are constituted by a single piece.

4. A steering arrangement as defined in claim 2, further comprising a steering yoke connected to the other end of said shaft, said yoke being provided with two handles which are pivotally mounted on said yoke, and, in neutral position of said yoke, are skewed with respect to said turning axis of said shaft.

5. In combination with a steering column and a steering shaft which controls a progressive steering mechanism, a yoke connected to said shaft for turning the same, said yoke being provided with two handles which are pivotally mounted on said yoke, and, in neutral position of said yoke, are skewed with respect to the axis about which the steering shaft turns, said yoke being further provided with transmission means interposed between the yoke proper, said steering column and said handles for causing one of said handles, upon turning of said yoke in at least one direction, to remain oriented in substantially the same direction as such handle was oriented prior to such turning of said yoke.

6. The combination defined in claim 5 wherein the transmission means for each handle comprises a hook-like element having three fingers one of which coacts with a bolt affixed to a steering column for said shaft, another of which fingers coacts with a further bolt affixed to said yoke and coaxial with said first bolt, and the third of which fingers is, at a point coaxial with said two bolts, pivotally connected to a guide collar which is rotatable with respect to said turning axis of the shaft, spring means acting on said collar for urging said hook-like element, through the intermediary of said collar, into engagement with said first bolt, and a linkage rod connected at one end to said hook-like element and at the other end to the respective handle at a point thereon which is spaced from the point at which such handle is pivotally connected to said yoke, thereby to form a parallelogram-type linkage which, when said yoke is turned in one direction, causes said last-mentioned handle to remain oriented in the same direction as it was oriented prior to such turning of said yoke, while permitting said hook-like element to disengage from said first bolt when said yoke is turned in the opposite direction.

7. A steering arrangement for a vehicle, comprising, in combination:
  (a) a steering shaft turnable about a turning axis and having a lower end;
  (b) two arm means carried by said steering shaft at said lower end thereof and being turnable together with said steering shaft;
  (c) a steering mechanism including a two-armed pitman;
  (d) a transmitting element mounted for pivotal movement about a pivot axis and coacting with said pitman of said steering mechanism, said transmitting element being provided with two grooves receiving said arm means, respectively, said grooves being arranged eccentrically with respect to said pivot axis for producing, upon turning of said steering shaft, a progressive pivoting of said pitman, said arm means being, in a neutral position of said steering shaft which the parts occupy when the vehicle is to move straight ahead, in mirror-image symmetry with respect to a plane passing through said turning and pivot axes, each of said grooves deviating from a circle whose center lies on said turning axis of said shaft and each of said grooves having a constant curvature, each of said arm means comprising an arm and pin means carried thereby, said pin means running in said grooves of said transmitting element, respectively;
  (e) a steering column;
  (f) a steering yoke connected to the other end of said shaft, said yoke being provided with two handles which are pivotally mounted on said yoke, and, in neutral position of said yoke, being skewed with respect to said turning axis of said shaft; and
  (g) transmission means interposed between said steering column, said yoke and said handles for causing one of said handles, upon turning of said yoke in at least one direction, to remain oriented in substantially the same direction as such handle was oriented prior to such turning of said yoke.

8. A steering arrangement as defined in claim 7 wherein said transmission means for each handle comprise a hook-like element having at least two fingers one of which coacts with a bolt affixed to said steering column for said shaft and the other of which fingers coacts with a further bolt affixed to said yoke and coaxial with said first bolt, and a linkage rod connected at one end to said hook-like element and at the other end to the respective handle at a point thereon which is spaced from the point at which such handle is pivotally connected to said yoke, thereby to form a parallelogram-type linkage which, when said yoke is turned in one direction, causes said last-mentioned handle to remain oriented in the same direction as it was oriented prior to such turning of said yoke, while permitting said hook-like element to disengage from said first bolt when said yoke is turned in the opposite direction.

9. A steering arrangement as defined in claim 8 wherein said transmission means further comprise a third finger of said hook-like element, a guide collar mounted for rotation with respect to said turning axis and pivotally connected to said third finger at a point thereon which is coaxial with said two bolts, and spring means acting on said collar for urging said hook-like element, through the intermediary of said collar, into engagement with said first-mentioned bolt.

10. A steering arrangement for a vehicle, comprising, in combination:
  (a) a steering shaft turnable about a turning axis and having a lower end;
  (b) two arm means carried by said steering shaft at said lower end thereof and being turnable together with said steering shaft;

(c) a steering mechanism including a two-armed pitman;

(d) a transmitting element mounted for pivotal movement about a pivot axis and coacting with said pitman of said steering mechanism, said transmitting element being provided with two grooves receiving said arm means, respectively, said grooves being arranged eccentrically with respect to said pivot axis for producing, upon turning of said steering shaft, a progressive pivoting of said pitman, said arm means being, in a neutral position of said steering shaft which the parts occupy when the vehicle is to move straight ahead, in mirror-image symmetry with respect to a plane passing through said turning and pivot axes, each of said grooves deviating from a circle whose center lies on said turning axis of said shaft and each of said grooves having a constant curvature, each of said arm means comprising an arm and pin means carried thereby, said pin means running in said grooves of said transmitting element, respectively;

(e) a steering column;

(f) a steering yoke connected to the other end of said shaft, said yoke being provided with two handles which are pivotally mounted on said yoke, and, in neutral position of said yoke, being skewed with respect to said turning axis of said shaft; and (g) transmission means interposed between said steering column, said yoke and said handles and being responsive to the turning movement of said shaft for causing one of said handles, upon turning of said yoke in at least one direction, to remain oriented in substantially the same direction as such handle was oriented prior to such turning of said yoke and for positioning said handles in dependence on the angular position of said shaft.

11. A steering arrangement as defined in claim 10 wherein said transmission means include biasing means for continuously urging said handles back to said neutral position which the parts occupy when the vehicle is to move straight ahead.

12. A steering arrangement for a vehicle, comprising, in combination:

(a) a steering shaft turnable about a turning axis and having a lower end;

(b) two arm means carried by said steering shaft at said lower end thereof and being turnable together with said steering shaft;

(c) a steering mechanism including a two-armed pitman;

(d) a transmitting element mounted for pivotal movement about a pivot axis and coacting with said pitman of said steering mechanism, said transmitting element being provided with two grooves receiving said arm means, respectively, said grooves being arranged eccentrically with respect to said pivot axis for producing, upon turning of said steering shaft, a progressive pivoting of said pitman, said arm means being, in a neutral position of said steering shaft which the parts occupy when the vehicle is to move straight ahead, in mirror-image symmetry with respect to a plane passing through said turning and pivot axes, each of said grooves deviating from a circle whose center lies on said turning axis of said shaft and each of said grooves having a constant curvature, each of said arm means comprising an arm and pin means carried thereby, said pin means running in said grooves of said transmitting element, respectively;

(e) a steering column;

(f) a steering yoke connected to the other end of said shaft, said yoke being provided with two handles which are pivotally mounted on said yoke, and, in neutral position of said yoke, being skewed with respect to said turning axis of said shaft; and (g) transmission means interposed between said steering column, said yoke and said handles and being responsive to the turning movement of said shaft for causing one of said handles, upon turning of said yoke in at least one direction, to remain oriented in substantially the same direction as such handle was oriented prior to such turning of said yoke and for positioning said two handles differently, depending on the turning of said shaft, in dependence on the angular position of said shaft.

References Cited by the Examiner

UNITED STATES PATENTS

| | | | |
|---|---|---|---|
| 1,320,278 | 10/1919 | Scheble | 74—497 |
| 1,784,230 | 12/1930 | Freeman | 74—557 |
| 2,827,801 | 3/1958 | Ingolia | 74—492 |

MILTON KAUFMAN, *Primary Examiner.*